United States Patent
Koskelainen

(10) Patent No.: US 8,767,569 B2
(45) Date of Patent: Jul. 1, 2014

(54) DYNAMIC DSCP AVAILABILITY REQUEST METHOD

(75) Inventor: Petri Koskelainen, Tampere (FI)

(73) Assignee: Nokia Corporation, Espoo (FI)

( * ) Notice: Subject to any disclaimer, the term of this patent is extended or adjusted under 35 U.S.C. 154(b) by 123 days.

(21) Appl. No.: 12/892,785

(22) Filed: Sep. 28, 2010

(65) Prior Publication Data

US 2011/0069768 A1 Mar. 24, 2011

Related U.S. Application Data

(63) Continuation of application No. 10/312,443, filed as application No. PCT/EP01/04331 on Apr. 12, 2001, now Pat. No. 7,830,810.

(30) Foreign Application Priority Data

Jun. 30, 2000 (GB) .................................. 0016185.1

(51) Int. Cl.
*H04J 1/16* (2006.01)
(52) U.S. Cl.
USPC .......................................................... 370/252
(58) Field of Classification Search
None
See application file for complete search history.

(56) References Cited

U.S. PATENT DOCUMENTS

| | | | |
|---|---|---|---|
| 5,745,480 A | 4/1998 | Behtash et al. | |
| 6,430,154 B1 | 8/2002 | Hunt et al. | |
| 6,574,195 B2 | 6/2003 | Roberts | |
| 6,611,522 B1 * | 8/2003 | Zheng et al. | 370/395.21 |
| 6,651,101 B1 | 11/2003 | Gai et al. | |
| 6,738,819 B1 | 5/2004 | Li et al. | |
| 6,944,169 B1 | 9/2005 | Yoshizawa et al. | |
| 6,999,420 B1 | 2/2006 | Chiu et al. | |
| 2001/0027490 A1 | 10/2001 | Fodor et al. | |
| 2002/0036983 A1 | 3/2002 | Widegren et al. | |
| 2004/0022191 A1 | 2/2004 | Bernet et al. | |

FOREIGN PATENT DOCUMENTS

| | | |
|---|---|---|
| GB | 2331659 A | 5/1999 |
| WO | WO-9502295 A1 | 1/1995 |
| WO | WO-0030295 A2 | 5/2000 |

OTHER PUBLICATIONS

ATM User-Network Interface (UNI) Signalling Specification Version 4.0, af-sig-0061.000, Technical Committee, The ATM Forum, Jul. 1996.*
Broadband Integrated Services Digital Network (B-ISDN)—Digital Subscriber Signalling System No. 2 (DSS 2)—User-Network Interface (UNI) Layer 3 Specification for Basic Call/Connection Control, ITU-T Recommendation Q.2931, Telecommunication Standardization Sector, International Telecommunication Union, Feb. 7, 1995.*

(Continued)

*Primary Examiner* — Dang Ton
*Assistant Examiner* — Ronald H Davis
(74) *Attorney, Agent, or Firm* — Mintz, Levin, Cohn, Ferris, Glovsky & Popeo, P.C.

(57) ABSTRACT

A communications interface between an end-user and an edge node of a communication network for establishing, prior to data transmission, the differentiated service code points supported by the network. The end-user first issues a service request message (42) to an edge node of the communication network. The edge node responds with an acknowledgement message (44) carrying information as to which DSCP's the network is able to support. Finally, the application at the end-user can decide how to mark the relevant packets during data transmission depending on the levels of differentiated service supported by the network.

24 Claims, 3 Drawing Sheets

(56) References Cited

OTHER PUBLICATIONS

B-ISDN ATM Layer Specification, ITU-T Recommendation I.361, Telecommunication Standardization Sector, International Telecommunication Union, Feb. 26, 1999.*

Traffic Control and Congestion Control in B-ISDN, ITU-T Recommendation I.371, Telecommunication Standardization Sector, International Telecommunication Union, Aug. 27, 1996.*

K. Nichols, et al., Definition of the Differentiated Services Field (DS Field) in the IPv4 and IPv6 Headers, RFC 2474, Network Working Group, The Internet Society, Dec. 1998.*

J. Postel, ed., Internet Protocol, DARPA Internet Program Protocol Specification, RFC 791, Sep. 1981.*

Broadband Integrated Services Digital Network (B-ISDN) and Broadband Private Integrated Services Network (B-PISN)—Prenegotiation, ITU-T Recommendation Q.2984, Telecommunication Standardization Sector, International Telecommunication Union, Dec. 3, 1999.*

B-ISDN General Network Aspects, ITU-T Recommendation I.311, Telecommunication Standardization Sector, International Telecommunication Union, Aug. 27, 1996.*

"The Complementary Roles of RRSVP and Differentiated Services in the Full-Service QOS Network", Bernet, IEEE Communications Magazine, IEEE Service Center, vol. 38, No. 2, Feb. 2000, pp. 154-162.

"Efficient Buffer Management and Scheduling in a Combined IntServ and DiffServ Architecture; a performance study", Mamais et al, 1999 2nd International Conference on ATM. ICATM'99, Proceedings of ICATM'99, Colmar, France Jun. 21-23, 1999, pp. 236-242.

"Differentiated Services: a new approach for Quality of Service in the Internet", Baumgartner et al, International Conference on High Performance Networking, XX, ,XX, Sep. 21, 1998, pp. 255-273.

"Real-Time Services over the Internet", Eriksson, ISS '97 World Telecommunications Congress, Global Network Evolution: Convergence or Collision? Toronto, Sep. 21-26, 1997, vol. 2, pp. 173-179.

* cited by examiner

DYNAMIC DSCP AVAILABILITY REQUEST METHOD

CROSS-REFERENCE TO RELATED APPLICATIONS

This application is a continuation application of U.S. patent application Ser. No. 10/312,443, entitled "DYNAMIC DSCP AVAILABILITY REQUEST METHOD," which is a national stage entry of PCT Patent Application No. PCT/EP01/04331 (PCT Publication No. WO 2002/003623), entitled "DYNAMIC DSCP AVAILABILITY REQUEST METHOD," and filed Apr. 12, 2001, which in turn claims the benefit of GB patent application 0016185.1, filed Jun. 30, 2000, the contents of all of which are hereby incorporated by reference in their entireties.

The present invention relates to the transmission of messages across different differentiated service communication networks.

The boundaries between the various 'traditional' networks are becoming increasingly blurred. Nowadays, there is a significant overlap between applications traditionally in the telecommunications domain, i.e. circuit-switched traffic (voice) and applications traditionally in the data communication domain, i.e. packet-switched traffic (data).

The two basic approaches to packet-switching are well known:

i) "Connection-oriented" technique where during an initial phase a 'virtual circuit' is first established between two end-users (analogous to a standard voice circuit) and then packet data is transmitted down this pipe. An example is the X.25 network commonly used for public packet data networks.

ii) "Connection-less" technique also known as datagram switching or a "best-effort network". An example of this approach is the Internet, which uses a datagram service where at each node (or router) the IP packet header is examined and the packet is routed to another intermediate node that is closer to the recipient. Thus, the packets are routed on a 'hop-by-hop' basis.

One of the differences between these two approaches is that the packet structure of the "connection-oriented" approach can use short headers, because the path of the envisaged data stream (virtual circuit) has already been established. In contrast, the data packets for the connection-less approach can arrive at the receiver in any order and each packet is treated as a 'self-contained' entity and therefore the header needs to carry full information about the intended recipient.

The unprecedented growth of the Internet has meant that network operators and service providers ISP's need to try and offer adaptable networks, which are flexible in allowing a variety of traffic including not only 'traditional' data traffic but also voice traffic (such as VoIP), data packet applications of a 'bursty' nature and emerging multimedia applications which include bandwidth, latency and jitter requirements.

The subject area concerned with the development of the various network architectures is constantly evolving to allow for possible future network expansion and/or more efficient implementation technologies. The IETF (Internet Engineering Task Force) attempts to standardise and coordinate working groups in emergent areas of Internet technology. One of these groups is the Differentiated Services work group (DiffServ). However, due to the advancements in this area, much of the techniques associated with Differentiated Services are still under development. Differentiated service mechanisms allow providers to allocate different levels of service to different users of the Internet, while accommodating heterogeneous application requirements.

QoS (Quality of Service) is an important set of parameters, which provide indication as to the quality of the service that can be expected from the network at a certain time. More generally, QoS is concerned with the measurement and improvement of transmission rates, error rates and trying to guarantee a certain level of transmission in advance. One of the major factors that influence the QoS is the amount of traffic on a communication network at any instant in time. The busier the network, the harder it will be for a 'bandwidth-intensive' application to obtain the required resources so that the transmission is of an acceptable quality. Certain applications (for example videophone) need to know the QoS to determine whether or not the service can be fully supported.

Differentiated Services will be referred to herein as "DiffServ". It should also be noted that the terms 'node' and 'router' may be used interchangeably in this description, because the specific example provided is the Internet where routers are used to switch data traffic.

Various technologies including DiffServ and RSVP (Resource Reservation Protocol) have been suggested to allow for so-called 'QoS-aware' data transfer, especially in multimedia applications (such as videophone) that place high bandwidth demands on the network. The known solutions each have limitations, which the present invention attempts to overcome.

Many modern "bandwidth-intensive" applications require a certain QoS to be certain that the application will be supported across the network. The Resource Reservation Protocol (RSVP) allows a host device to request a specific QoS from the network, on behalf of the application. To do this, the RSVP makes resource reservations for each node in the network that carries a particular application's data stream. Each node determines whether there are sufficient resources (i.e. bandwidth) to provide the required QoS value. The main drawbacks of RSVP are that this technique is complex, requires a lot of overhead processing in every hop and does not scale well. It is evident that the greater the number of nodes in a network, the more RSVP signalling will be required to determine whether a certain QoS can be sustained.

The Differentiated Services architecture is also 'QoS aware', however whereas RSVP incurs large overhead in negotiating sufficient resources from each node of an envisaged data path, no signalling between nodes is required for DiffServ. Instead edge routers, within a DiffServ-capable network, 'mark' the header of each IP (Internet Protocol) packet making up a particular applications data stream with a certain priority value known as a code point. The intermediate nodes then identify the code point field, which is translated into a particular PHB (Per Hop Behaviour) and the packet is forwarded accordingly. The advantage of such a scheme is that the processing and associated storage circuitry for each intermediate router is considerably simplified since QoS is invoked on a per-packet basis. However, the present state of the Differentiated Services architecture, herein referred to as "basic DiffServ", also has inherent problems.

The per-packet code point values are set by the sending application. Therefore, basic DiffServ does not guarantee resources and the recipient is limited in controlling the QoS of the received data stream. Also, before transmitting the data stream the sender does not know which DSCP's (Differential Service Code points) are supported.

It is an aim of the present invention to overcome or at least mitigate these problems.

The present invention provides in one aspect a method of transmitting data in a communications system to take into account networks capable of supporting different service levels, wherein i) a service request message is sent to a network across which the data is to be transmitted; ii) a response message is issued from the network identifying the service levels supported by the network; iii) the data is marked with a service identifier identifying a service level selected from the service levels supported by said network; and iv) said marked data is transmitted across the network in accordance with the identified service level.

Preferably, the network comprises a plurality of nodes, at each of which the service identifier of a received data is examined and translated into a forwarding behaviour. In one embodiment the data is Internet Protocol (IP) packets, and the service identifier is in the form of a Differentiated Services code point (DSCP).

Also, in the described embodiment, each data packet has a packet header and said code point is located in an 8-bit field in bit positions 8 to 15 of said packet header. The response message returns the service levels in the form of a list of DiffServ code points.

The present invention also provides data transmission circuitry for transmitting data over a communications network said data transmission circuitry comprising: means for issuing a service request message to said communications network; and means for selecting from a list of returned service identifiers a class of service for transmitting a message and marking data of that message with the selected service identifier.

The present invention also provides data receiving circuitry forming part of a communications network capable of supporting different classes of service for transmitting messages, said data receiving circuitry comprising: a store holding a list of service identifiers corresponding to classes of service capable of being supported by said communications network; and means for formulating a response message in response to receiving a service request message from the user to acknowledge said request, said response message containing the list of service identifiers.

The present invention will now be described by way of an example with reference to the accompanying drawings, in which:—

The embodiment described below discusses a DiffServ network that overcomes the scaleability issues of an RSVP network, while improving the existing DiffServ architecture by providing the end-users with a means of establishing the capability of the network before data transfer.

Figure 1:
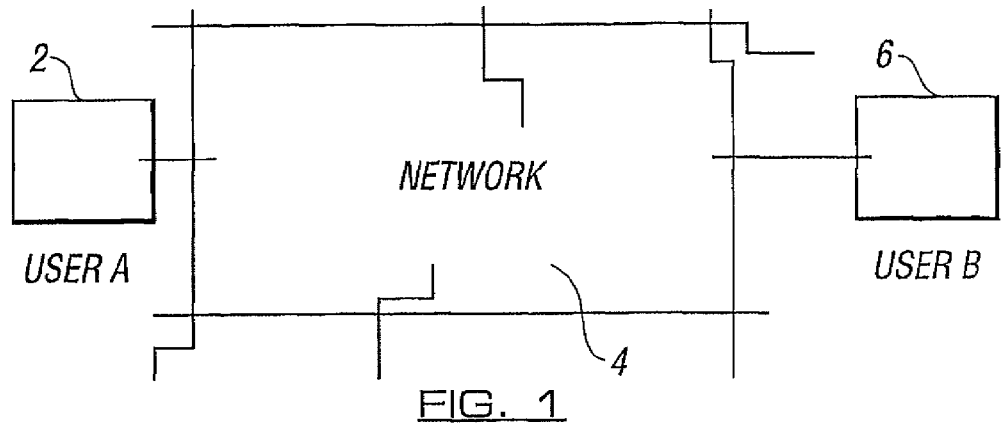
FIG. 1 shows a generic network model of end-users being connected through an intermediate network.

FIG. 1 shows a general network cloud 4 that allows two end-users, i.e. USER A 2 and USER B 6 to communicate. There are various types of networks and protocols that may be applied to this generic model. For example, the network 4 might be any of the following: PSTN (Public Switched Telecommunication Network), PLMN (Public Land Mobile Network), Internet, Intranet, X.25, LAN (Local Area Network), WAN (Wide Area Network), etc. and the protocols might be even more numerous.

Figure 2:
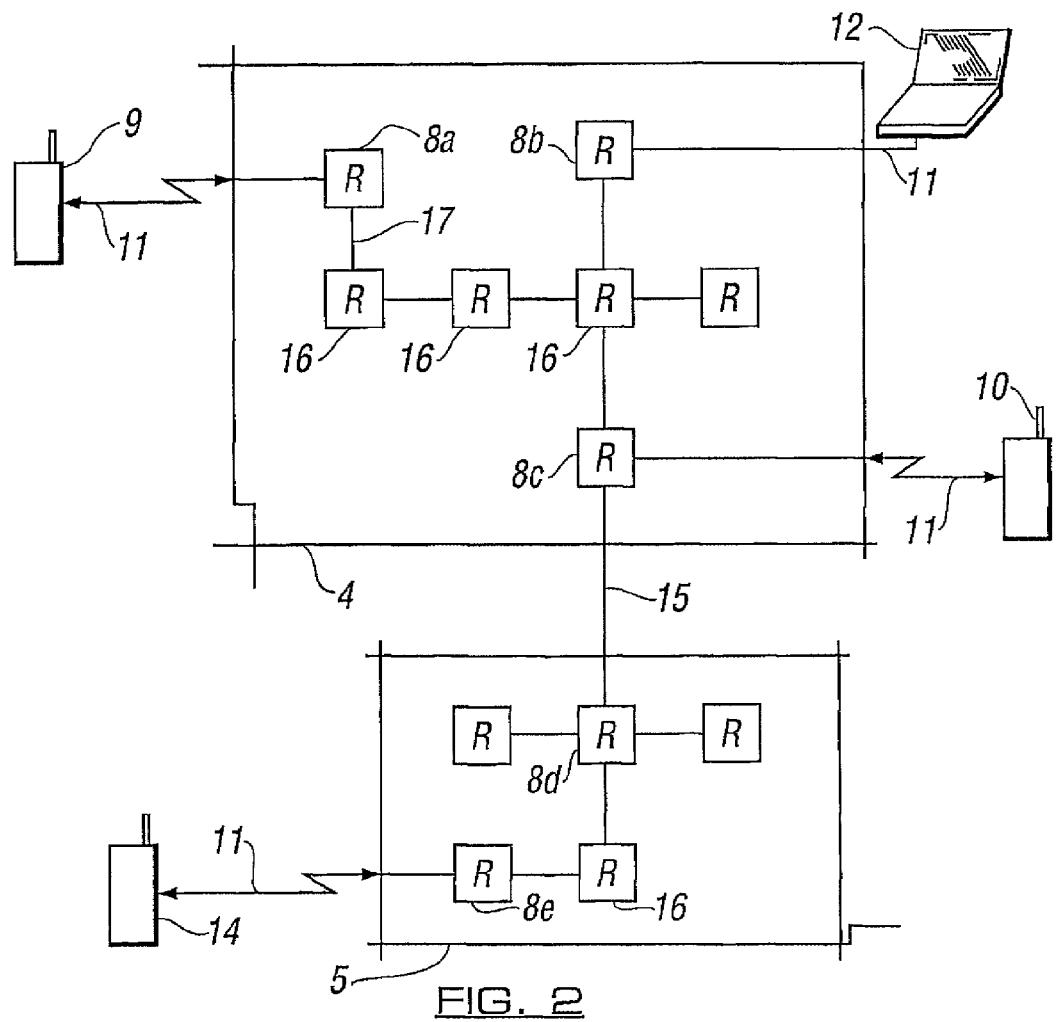
FIG. 2 shows an example of how packets of a videophone application may be routed through the Internet from a sender to a receiver.

FIG. 2 shows an example where the network 4 is the Internet. It will be assumed that a videophone service needs to be provided between a sender 9 and a recipient 10 over the Internet 4. Data packets that make up the video stream will be switched through the Internet from the sender 9 to the recipient 10 using the IP (Internet Protocol) and routers R labelled 8a, 8b, 8c and 16 to route the data packets.

A number of elements that are important to the DiffServ architecture need to be defined. There are 'edge' or 'leaf' nodes (routers) 8a, 8b, 8c located at the borders of a network and either connect to an end-user via end-user connections 11 or to another network 5 via a network connection 15. Intermediate nodes (routers) 16 occupy the 'heart' of the network and packets are passed to or from other intermediate nodes 16 or edge nodes 8a,8b,8c.

Figure 3:
FIG. 3 shows the basic structure of a data packet.

FIG. 3 shows the basic structure of a data packet comprising a header portion 20 and a data portion 22. Two versions of the Internet Protocol (IP) are specified for DiffServ, i.e. either version 4 or version 6. Both versions include a header having a number of fields. In particular, the IPv4 header includes a 'TOS' (Type of Service) and the IPv6 header includes a 'Traffic Class' field. The main idea behind DiffServ is to modify the 'TOS (type of Service)' field in the header of an IPv4 packet, or the 'Traffic Class' field in the header of an IPv6 packet, to become a DS byte field known as the DS field.

Figure 4:
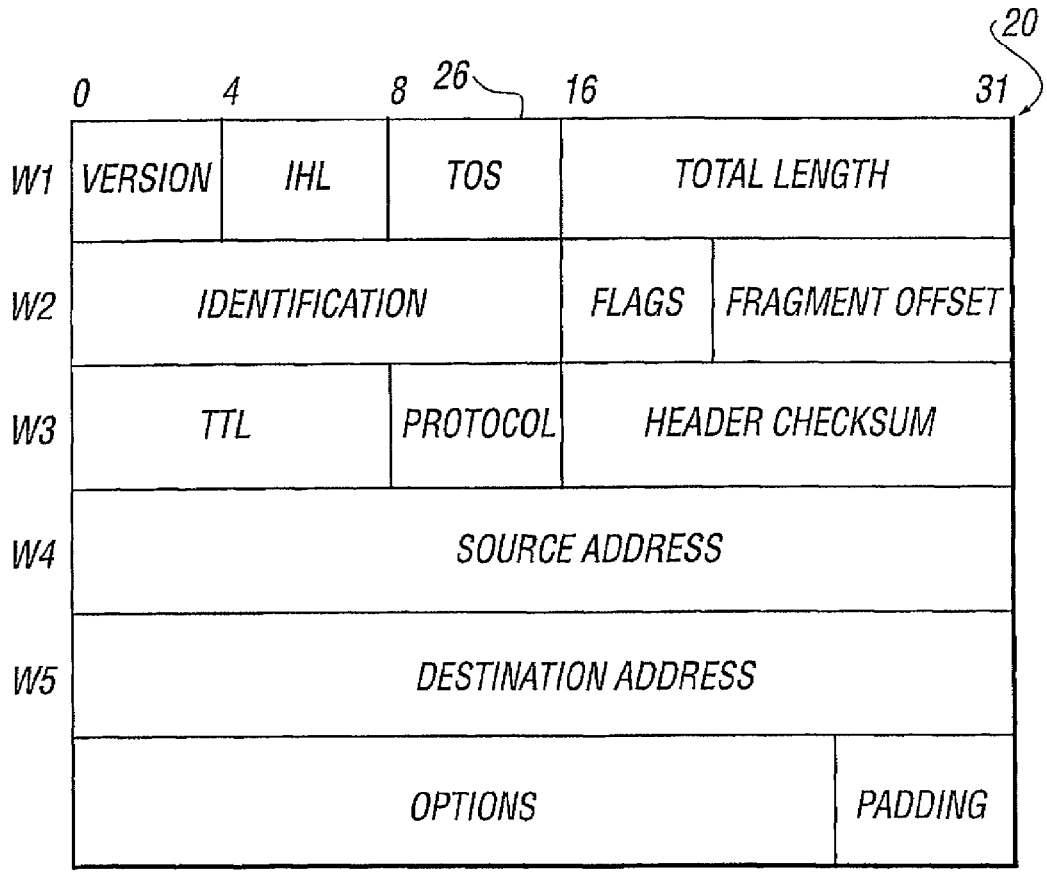
FIG. 4 shows an IPv4 (Internet Protocol version 4) packet header.
Figure 5:
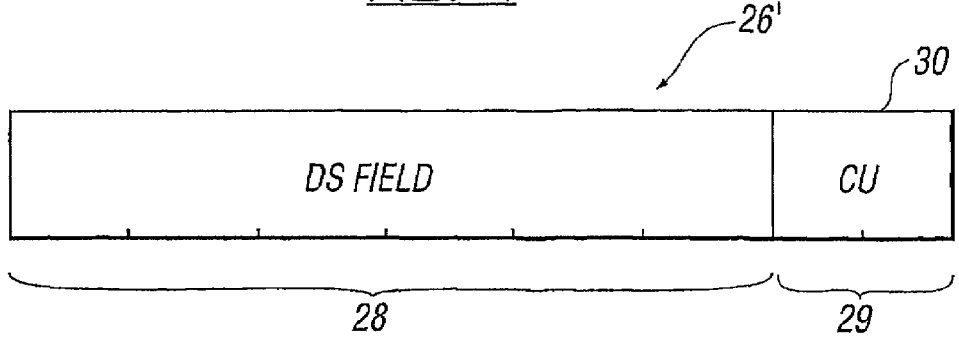
FIG. 5 shows an enlarged view of the DS (Differential Services) field.

FIG. 4 shows the structure of the header for an IP packet in IPv4. It can be seen that the header consists of five 32-bit words W1-W5, where bits 8-15 of the first word W1 are used for the Type of Service (TOS) octet 26. FIG. 5 shows the modified octet 26', which consists of a 6-bit DS field 28 used to mark the packet with a certain DSCP (Differential Services Code Point). The two remaining bits 29 are currently unused (CU).

Each packet receives a particular forwarding treatment at each node based on the marked bit pattern which defines the DSCP's. That is, each node of the network contains a mapping table for translating each DSCP field into a specific per-hop behaviour (PHB). As is known, the PHB for a packet is the forwarding behaviour it receives at a given network node, for example "best effort" or "normal". Therefore, a network node inspects each received data packet and ascertains from the DSCP what the class or the priority of the packet is and how it should be forwarded. The bit patterns defining the code points (DSCP's) have been standardised to some degree by the IETF's DiffServ working group. A number of code points are shown in Annexe 1 taken from RFC (Request For Comments) 2474.

The 8-bit DS field 26' is capable of conveying 64 distinct code points. From Annex 1, it can be seen that the code point space is divided into three pools where 'x' refers to either '0' or '1':

Pool 1 containing 32 code points that have been provisionally assigned as indicated.

Pool 2 containing 16 code points (Pool 2) to be reserved for experimental or Local Use, and Pool 3 containing 16 code points, which are initially available for experimental or local use, but would be used for any other standardised assignments if Pool 1 is ever exhausted.

It can be seen that pool 1 has 1 EF (Expedited Forwarding) code point, 12 AF (Assured Forwarding) code points and several local use code points (CSO-7). Furthermore, the 12 AF code points consists of four AF 'classes' where each class has three code points representing levels of priority known as 'drop precedences'. For example, AF class 1 is composed of three drop precedences, i.e. AF11, AF12 and AF13.

To use DiffServ, code points (DSCP's) are assigned at the edge nodes 8a, 8b, 8c of the network. In FIG. 2, the videophone service (sender 9) is aware of the QoS needed to support it and marks the DS field 26' in the packets it transmits with the required code point. The edge routers 8a, 8b, 8c would also contain traffic conditioning entities such as: meters, markers, droppers, and shapers that could re-mark a traffic stream or may discard or shape packets to comply with a desired traffic profile.

In so-called basic DiffServ there is a danger that certain nodes of the intermediate network may not be able to support the selected DSCP in the packet. In that case, the node will remark the DSFIELD accordingly. The result may be a poor quality transmission or the video stream may be dropped altogether.

Figure 6:
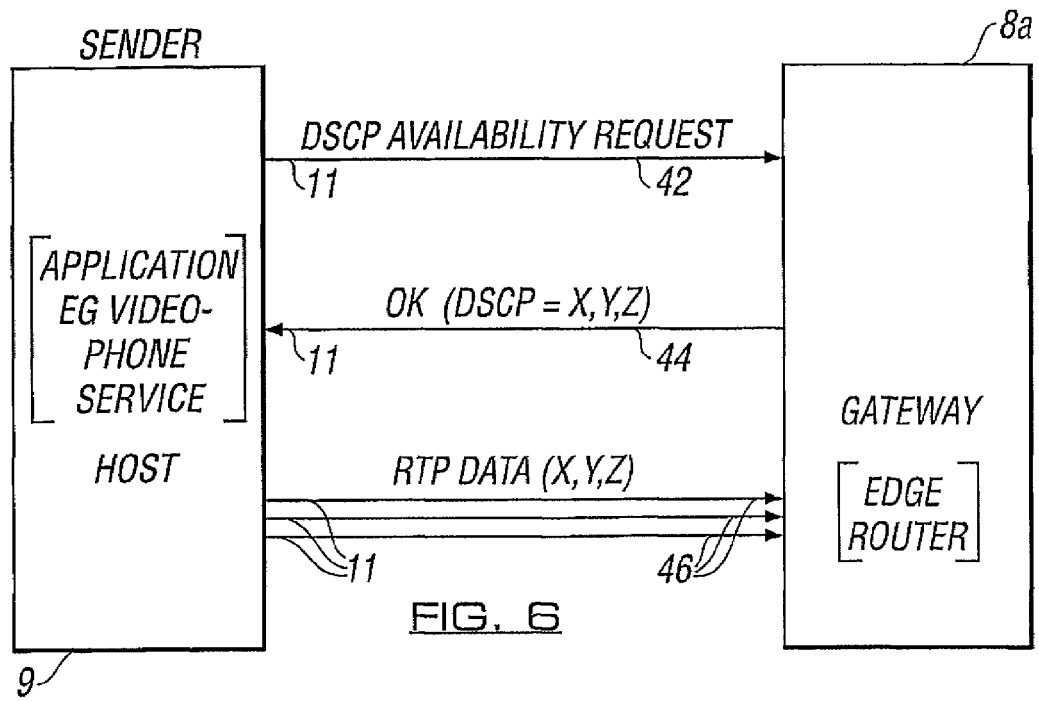
FIG. 6 shows the interface signals between the sending application and the DSCP gateway.

The described embodiment of the invention avoids this as described below. FIG. 6 shows the interface 11 between the sender 9 and the gateway to the network 4. The gateway is the edge router 8a attached to the sender 9. The interface 11 may be implemented by slight modifications to various existing signalling protocols including SIP, RTCP, Cops, SNMP, HTTP or a new 'lightweight' protocol may be developed, for example an ASCII-based request/response protocol.

The following sequence of events are executed prior to actual data transmission of the video stream. A sending application at the sender 9 wishes to transmit a video data stream for a videophone application through the network 4 to the receiver 12. Firstly, the sender 9 issues a DSCP AVAILABILITY REQUEST message 42 addressed to the gateway 8a. The gateway 8a holds a list of the available DSCP's that the network can support. The gateway may also contain a user profile where only certain users may have access to certain DSCP's. This can be done on a cost basis, i.e. for a 'premium' class of service a higher DSCP will be made available at increased cost. The concept of 'user profiling' and 'policies' are well known and beyond the scope of the present invention. Next, the gateway 8a responds with an OK message 44 to the sender 9 acknowledging the request message and carrying additional information that defines all the available DSCP's available to the application at the sender 9. If, for example the message is:

OK(X, Y, Z)

this informs the sending application at the sender 9 that classes X, Y and Z are available. The sending application is then able to start transmitting the RTP (Real Time Protocol) data streams 46 using DSCP's X, Y or Z, selected on a per-packet basis by the sending application.

By requesting the supported DSCP's before data transmission, the sending application is able to act accordingly and classify packets based on this information thus improving the perceived quality of the IP video stream. In many applications, particularly video, packets have different importance. The classification of these packets can be made very efficient if the sending application knows in advance, which DSCP's are supported by the network.

It is also possible that the list of supported DSCP's is changed in the gateway 8a. If so, the gateway 8a informs end-users about the change by using local multicasting, where the list of supported DSCP's is transmitted to all registered end-users at the same time or alternatively by direct unicasting where the list is only supplied to a single specified end-user address at any given time. It is beneficial for a network operator that end-users (customers) are dynamically updated about the supported DiffServ classes so that precious network resources are not wasted in trying to provision a particular service that cannot be supported for whatever reason.

The present invention is interoperable with existing systems. Furthermore, important issues such as security and reliability are easily implemented. As with other signalling protocols, for example HTTP (Hyper Text Transfer Protocol) or SIP (Session Initiation Protocol), authentication of users or sending applications is made possible using known techniques, for example using public keys. If the sending party's request 42 is not acknowledged reliability can be achieved by re-transmissions. The sending party might use a simple timeout algorithm, where if a response is not received from a gateway within a predefined period, the DSCP AVAILABILITY REQUEST message 42 will be re-transmitted.

It has already been described that the present invention will be interoperable with existing Diffserv technologies. Therefore, concepts such as an RTP (Real Time Protocol) QoS Manager or a BB (Bandwidth Broker), introduced as part of the Differential Services architecture would still apply. The RTP QoS Manager is an object that may reside within or outside the sending application of the sender 9 and whose purpose is manage and organise the packets particularly for multimedia traffic streams having real-time constraints. The BB is a functional entity used at a higher level in dealing with the control or resource management both within a DiffServ-capable network (i.e. intra-domain resource management) and between a plurality of DiffServ-capable networks (i.e. inter-domain resource management).

Figure 7:
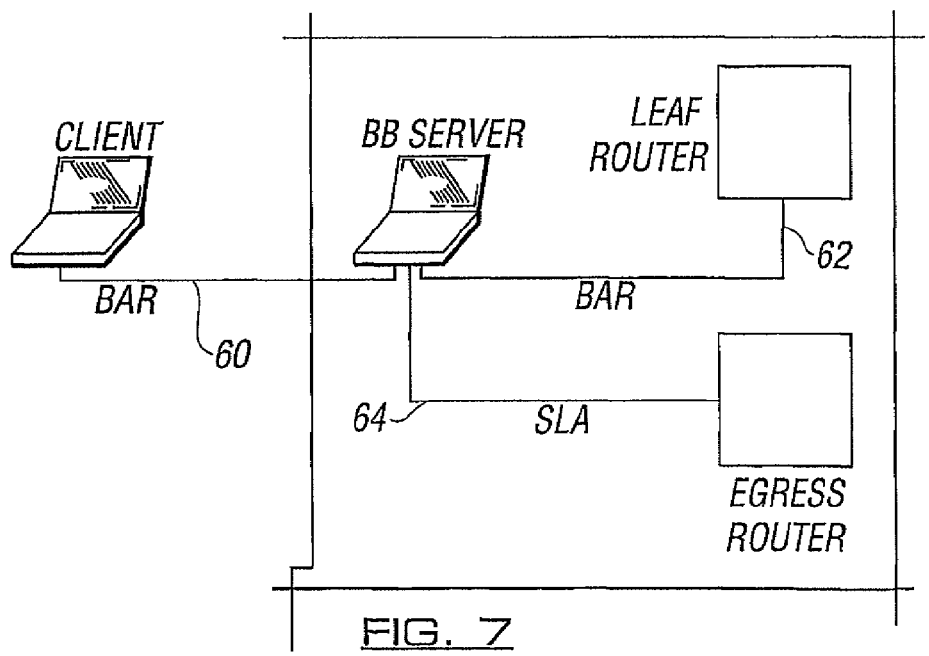
FIG. 7 shows a BB (Bandwidth Broker) system.

FIG. 7 represents a typical BB system with a client/server relationship, where collaborating network operators or customers may use a client terminal to enter various parameters relating to SLA (Service Level Agreements) and/or BAR (Bandwidth Allocation Requests), which have previously been established. DiffServ boundary nodes may act as both a DiffServ 'ingress node' and/or an 'egress node' depending on the direction of traffic. Traffic enters at a Diffserv-capable network at a DS ingress node and leaves at a DS egress node.

Therefore, in FIG. 2 the node 8c is an egress router, which is the edge router responsible for transmitting the video stream packets to the second network 5. The BB server is able to communicate with edge routers to set up their corresponding traffic conditioning elements.

Referring back to FIG. 2 it can be seen that in certain situations a data stream may 'cross' networks in trying to reach a final destination. For example, consider the case when the sending application at the sender 9 connected to a first network 4 wishes to transmit a video stream to a receiver 14 connected to a second network 5. Although, the sender 9 may have communicated with the first network over interface 11 where it was established which DSCP's are available in network 4, the sender 9 cannot be certain that the same DSCP's are supported in the second network 5.

This problem may be solved by the BB, which could make a similar DSCP AVAILABILITY REQUEST message to the edge router 8d of network 5. The OK response contains a list of supported DSCP's in the second network 5, which the BB could forward back to the sender. The sender now has knowledge of which DSCP's are available in both networks. If the first network supports classes X, Y and Z, while the second network only supports classes X and Z, then the sending party knows that the video stream packets should only be marked with the DSCP's X and Z. If the sender 9 decides that the video stream to be transmitted needs to have the data packets marked with at least three DSCP's (X, Y and Z) to be adequately supported, then the video stream service will not be transmitted to the recipient 14, until the second network supports the Y class.

The implementation of an 'inter-domain availability method' is possible as the BB in basic Diffserv describes the edge routers of DiffServ-capable networks each having an interface with the BB so that inter-domain resource management functions such as SLA's (Service Level Agreements) and BAR (Bandwidth Allocation Requests) may be performed, as shown in FIG. 7. It will be appreciated as described above that the BB element is at a higher level than the routing network and as such the links 60, 62 and 64 are not the same as the links 17 of FIG. 2.

It should be realised that the BB is provided as an example of how the present invention may be incorporated into an element of the DiffServ architecture and is intended to be non-limiting. It would be appreciated by a man skilled in the art that the present invention may be adapted to other DiffServ elements equally well.

Annexe 1.

| Pool | Codepoint space | Assignment Policy | Reference |
|---|---|---|---|
| 1 | xxxxx0 | Standards Action | [RFC2474] |
| 2 | xxxx11 | EXP/LU | [RFC2474] |
| 3 | xxxx01 | EXP/LU (*) | [RFC2474] |

Pool 1 Code points (Guidelines from RFC2474)

| Name | Space | Reference |
|---|---|---|
| CS0 | 000000 | [RFC2474] |
| CS1 | 001000 | [RFC2474] |
| CS2 | 010000 | [RFC2474] |
| CS3 | 011000 | [RFC2474] |
| CS4 | 100000 | [RFC2474] |
| CS5 | 101000 | [RFC2474] |
| CS6 | 110000 | [RFC2474] |
| CS7 | 111000 | [RFC2474] |
| AF11 | 001010 | [RFC2597] |
| AF12 | 001100 | [RFC2597] |
| AF13 | 001110 | [RFC2597] |
| AF21 | 010010 | [RFC2597] |
| AF22 | 010100 | [RFC2597] |
| AF23 | 010110 | [RFC2597] |
| AF31 | 001110 | [RFC2597] |
| AF32 | 011100 | [RFC2597] |
| AF33 | 011110 | [RFC2597] |
| AF41 | 100010 | [RFC2597] |
| AF42 | 100100 | [RFC2597] |
| AF43 | 100110 | [RFC2597] |
| EF PHB | 101110 | [RFC2598] |

The invention claimed is:

1. A method, comprising:
receiving a response message from a network in response to a service request message for transmission of data, the response message identifying at least one service level supported by the network and identifying an associated forwarding treatment;
marking a first data to be transmitted with a service identifier identifying a selected service level from the at least one service level supported by the network and identified in the response message;
receiving an update message from the network, the update message updating the at least one service level supported by the network and indicating a corresponding forwarding treatment, wherein the corresponding forwarding treatment indicated in the update message is different from the associated forwarding treatment identified in the response message; and
marking a second data to be transmitted with one service identifier which identifies a selected one of the updated at least one service level supported by the network, the marked second data having the one service identifier is forwarded based on the corresponding forwarding treatment indicated in the selected one of the updated at least one service level.

2. The method of claim 1, further comprising:
sending the service request message to the network; and
transmitting the marked second data with the one service identifier identifying the selected one of the updated at least one service level.

3. The method of claim 2, wherein the response message is received in response to the service request configured as a differentiated services code point availability request, the response message including service levels configured as differentiated services code points.

4. The method of claim 2, wherein the sending the service request message comprises sending the service request message to the network for transmission of internet protocol packets.

5. The method of claim 4, wherein the marking the second data comprises marking a packet header of the internet protocol packets with a differentiated service code point in an 8-bit field in bit positions 8 to 15 of said packet header.

6. The method according to claim 2, wherein the sending the service request message comprises sending the service request message to the network, the network comprising intermediate nodes and edge nodes, the edge nodes being located at the borders of the network.

7. The method according to claim 6, further comprising:
interfacing the service request message and the response message between a sending end-user and at least one edge node of the network.

8. The method of claim 6, wherein the sending the service request message comprises sending the service request message to one of said edge nodes with a plurality of differentiated services code points supported by the network.

9. The method of claim 1, wherein the receiving the response message comprises receiving the response message identifying the at least one service level in the form of a list of differentiated service code points.

10. The method of claim 1, wherein marking the second data with the one service identifier comprises marking the second data with a differentiated service code point.

11. The method of claim 1, wherein at least one of the at least one service level is different from the updated at least one service level.

12. The method of claim 1, wherein the first marked data and the second marked data comprise some of the same data.

13. The method of claim 1, wherein the first marked data and the second marked data comprise different data.

14. An apparatus, comprising:
at least one processor; and
at least one memory including computer program code for the at least one processor, wherein the at least one processor, the at least one memory, and the computer program code causes the processor to perform at least:
receive a response message from a network in response to a service request message for transmission of data, the response message identifying at least one service level supported by the network and identifying an associated forwarding treatment;
mark a first data to be transmitted with a service identifier identifying a selected service level from the at least one service level supported by the network and identified in the response message;

receive an update message from the network, the update message updating the at least one service level supported by the network and indicating a corresponding forwarding treatment, wherein the corresponding forwarding treatment indicated in the update message is different from the associated forwarding treatment identified in the response message; and mark a second data to be transmitted with one service identifier which identifies a selected one of the updated at least one service level supported by the network, the marked second data having the one service identifier is forwarded based on the corresponding forwarding treatment indicated in the selected one of the updated at least one service level.

15. The apparatus according to claim 14, wherein the apparatus is further configured to at least:

send the service request message to the network; and select the one of the at least one service level identified in the update message.

16. The apparatus of claim 15, wherein the apparatus is further configured to at least send the service request message to the network, the network comprising a plurality of nodes, wherein at least one of the plurality of nodes is configured to examine and to translate at least one service identifier into a forwarding behavior.

17. The apparatus of claim 16, wherein the apparatus is further configured to at least send the service request message to the network, the network comprising intermediate nodes and edge nodes, the edge nodes being located at the borders of the network.

18. The apparatus of claim 17, wherein the apparatus is further configured to at least:

configure the at least one processor to interface the service request message and the response message between a sending end-user and at least one edge node of the network.

19. The apparatus of claim 17, wherein the apparatus is further configured to at least send the service request message to a one of said edge nodes with a plurality of differentiated services code points supported by the network.

20. The apparatus of claim 15, wherein the apparatus is further configured to at least send at least the service request message to the network for transmission of internet protocol packets.

21. The apparatus of claim 20, wherein the apparatus is further configured to at least mark a packet header of the internet protocol packets with a differentiated service code point in an 8-bit field in bit positions 8 to 15 of said packet header.

22. The apparatus of claim 14, wherein the apparatus is further configured to at least receive the response message identifying the at least one service level in the form of a list of differentiated service code points.

23. The apparatus of claim 14, wherein the apparatus is further configured to at least mark the second data with a differentiated service code point.

24. A non-transitory computer-readable medium encoded with instructions that, when executed by at least one processor, causes the at least one processor to perform at least the following:

receiving a response message from a network in response to a service request message for transmission of data, the response message identifying at least one service level supported by the network, and identifying an associated forwarding treatment;

marking a first data to be transmitted with a service identifier identifying a selected service level from the at least one service level supported by the network and identified in the response message;

receiving an update message from the network, the update message updating the at least one service level supported by the network and indicating a corresponding forwarding treatment, wherein the corresponding forwarding treatment indicated in the update message is different from the associated forwarding treatment in the response message; and marking a second data to be transmitted with one service identifier which identifies a selected one of the updated at least one service level supported by the network, the marked second data having the one service identifier is forwarded based on the corresponding forwarding treatment indicated in the selected one of the updated at least one service level.

* * * * *